United States Patent
Duke et al.

(10) Patent No.: US 8,005,676 B2
(45) Date of Patent: Aug. 23, 2011

(54) SPEECH ANALYSIS USING STATISTICAL LEARNING

(75) Inventors: Gary Duke, Epsom (GB); Joseph Watson, Alpharetta, GA (US)

(73) Assignee: Verint Americas, Inc., Roswell, GA (US)

( * ) Notice: Subject to any disclaimer, the term of this patent is extended or adjusted under 35 U.S.C. 154(b) by 1026 days.

(21) Appl. No.: 11/540,281

(22) Filed: Sep. 29, 2006

(65) Prior Publication Data

US 2008/0082336 A1 Apr. 3, 2008

(51) Int. Cl.
*G10L 15/04* (2006.01)

(52) U.S. Cl. ........ 704/254; 704/260; 704/270; 704/258; 704/267; 704/242

(58) Field of Classification Search .................. 704/260, 704/251, 235, 258, 254, 231, 267, 242, 246, 704/270

See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner* — Vijay B Chawan
(74) *Attorney, Agent, or Firm* — McKeon, Meunier Carlin & Curfman LLC

(57) ABSTRACT

Included are embodiments for providing speech analysis. At least one embodiment of a method includes receiving audio data associated with a communication and providing the at least one phoneme in a phonetic transcript, the phonetic transcript including at least one character from a phonetic alphabet.

22 Claims, 9 Drawing Sheets

U.S. PATENT DOCUMENTS

| | | | |
|---|---|---|---|
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,737,725 A * | 4/1998 | Case | 704/260 |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,148,285 A * | 11/2000 | Busardo | 704/260 |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazer | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,928,407 B2 * | 8/2005 | Ponceleon et al. | 704/253 |
| 6,959,078 B1 | 10/2005 | Eilbacher et al. | |
| 6,965,886 B2 | 11/2005 | Govrin et al. | |
| 7,120,900 B2 * | 10/2006 | Atkin | 717/117 |
| 7,124,082 B2 * | 10/2006 | Freedman | 704/260 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |
| 2003/0187642 A1 * | 10/2003 | Ponceleon et al. | 704/252 |
| 2004/0073423 A1 * | 4/2004 | Freedman | 704/235 |
| 2004/0100507 A1 | 5/2004 | Hayner et al. | |
| 2004/0165717 A1 | 8/2004 | McIlwaine et al. | |
| 2006/0074656 A1 * | 4/2006 | Mathias et al. | 704/243 |
| 2007/0088547 A1 * | 4/2007 | Freedman | 704/235 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (@2001).

De Bra et al., "Adaptive Hypermedia: From Systems to Framework," ACM (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," Personal Learning Network pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, Thinq Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," T*echnical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,"* *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *Info World* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . .* (But Were to Sensible to Ask), PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You on (Yet)*, The AnchorDesk, Jul. 13, 1999.

Borland and Davis. *US West Plans Web Services on TV*, CNETNews.com, Nov. 22, 1999.

Brown. *Let PC Technology Be Your TV* Guide, PC Magazine, Jun. 7, 1999.

Brown. *Interactive TV: The Sequel*, NewMedia, Feb. 10, 1998.

Cline. Déjà vu—Will Interactive TV Make It This Time Around?, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

Needle. *Will The Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, Mar. 28, 1996.

Kenny. *TV Meets Internet*, PC World Online, Mar. 28, 1996.

Linderholm. *Avatar Debuts Home Theater PC, PC* World Online, Dec. 1, 1999.

Rohde. *Gates Touts Interactive TV*, InfoWorld, Oct. 14, 1999.

Ross. *Broadcasters Use TV Signals to Send Data*, PC World Oct. 1996.

Stewart. *Interactive Television at Home: Television Meets the Internet*, Aug. 1998.

Wilson. *U.S. West Revisits Interactive TV*, Interactive Week, Nov. 28, 1999.

\* cited by examiner

SPEECH ANALYSIS USING STATISTICAL LEARNING

BACKGROUND

As communication technologies have improved, businesses and individuals have desired greater functionality in their communication networks. As a nonlimiting example, many businesses have created call center infrastructures, in which a customer or other user can call to receive information related to the business. As customers call into the call center, the customer may be connected with a customer service representative to provide desired information. Depending on the time of call, the subject matter of the call, and/or other information, the customer may be connected with different customer service representatives. As such, depending on these and/or other factors, the customer may be provided with varying levels of quality with respect to the interaction with a customer service representative. Because most businesses desire to provide the highest possible quality of customer service, many businesses have turned to recording the communication between the customer and the customer service representative. While recording this data has proven beneficial in many cases, many businesses receive call volumes that inhibit the business from reviewing all of the call data received.

As such, many businesses have turned to speech recognition technology to capture the recorded communication data and thereby provide a textual document for review of the communication. While textual documentation of a communication has also proven beneficial, a similar scenario may exist, in that the sheer amount of data may be such that review of the data is impractical. To combat this problem, a number of businesses have also implemented speech analytics technologies to analyze the speech recognized communications. One such technology that has emerged includes large vocabulary continuous speech recognition (LVCSR). LVCSR technologies often convert received audio from the communications into an English translation of the communication in a textual document. From the textual document, analytics may be provided to determine various data related to the communication.

While LVCSR technologies have improved the ability to analyze captured data, LVCSR technology often consumes a large amount of resources in converting the audio data into a textual format and/or analyzing the textual data. As such, phonetic speech to text technologies have also emerged. While phonetic speech to text technologies provide analytic functionality, many of the features that may be provided in an LVCSR type speech to text technology may be unavailable.

Thus, a heretofore unaddressed need exists in the industry to address the aforementioned deficiencies and inadequacies.

SUMMARY

Included are embodiments for providing speech analysis. At least one embodiment of a method includes receiving audio data associated with a communication and providing at least one phoneme in a phonetic transcript, the phonetic transcript including at least one character from a phonetic alphabet.

Also included are embodiments of a system for providing speech analysis. At least one embodiment of a system includes an audio receiving component configured to receive audio data associated with a communication and a providing component configured to provide at least one phoneme in a phonetic transcript, the phonetic transcript including at least one character from a phonetic alphabet.

Also included are embodiments of a computer readable medium for providing speech analysis. At least one embodiment of a computer readable medium includes audio receiving logic configured to receive audio data associated with a communication and providing logic configured to provide at least one phoneme in a phonetic transcript, the phonetic transcript including at least one character from a phonetic alphabet.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
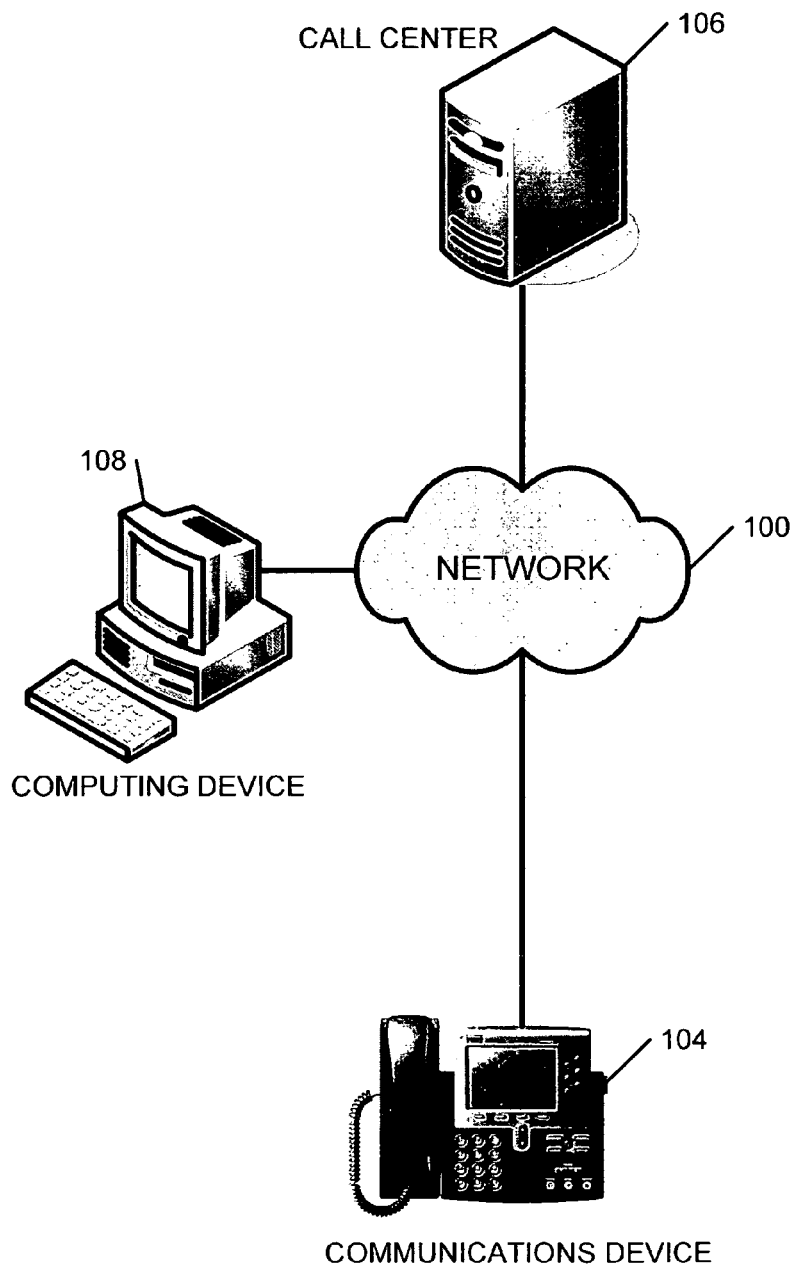
FIG. 1 is a nonlimiting example of a network configuration in which a user may be provided with customer service.

Included are techniques for using a phonetic speech recognition engine to produce a phonetic transcript of a communication. The phonetic transcript may include information about the sounds that occurred in speech without attempting to reconstruct these "phonemes" into syllables and words. Additionally at least one exemplary embodiment includes the phonetic transcript as an index file. The index file can be configured for easy searching of phonemes and combinations of phonemes.

Regardless, this data can then be used as an input to an automated scoring system that can learn to spot patterns that identify various data related to the communication, including one or more components for determining quality of customer service. In at least one embodiment, the scoring system can make this determination based on samples associated with previous scores. Thus, processing of all calls in a call center with relatively little custom configuration can be achieved, as well as adaptation over time without requiring extensive reconfiguration.

One should note that a call center can include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

More specifically, recording and scoring calls (by various call-center-specific criteria) is a tool that may be used by call centers to monitor the quality of customer service. While, in at least one embodiment, scoring may largely be calculated manually, for some configurations, automated scoring may be desired. Automation can be performed by configuring a set of rules into a scoring system and applying the rules to calls automatically.

Additionally, some embodiments include an automatic learning component, which may be configured to search for and identify patterns that can then be used to score future calls. The automatic learning component may receive as much relevant data as possible about the call (e.g., telephony events, information from Computer Telephone Integration (CTI) logic, such as customer ID, and data such as key presses recorded from the agent's computing device and/or communications device).

Once the automatic learning component has analyzed enough calls to generate some useful patterns, the automatic learning component can apply patterns to new calls for automatically scoring. Further, manually scored calls can be sent to the scoring engine to help the patterns adjust over time, or when scoring requirements change.

In at least one embodiment, a phonetic engine may be configured to preprocess ("ingest") raw audio data and produce a summarized form of the audio data, which includes phonetic data. The raw data and/or the phonetic summary, however, may be impractical to use in an automatic learning system. Oftentimes the raw audio data and/or the phonetic summary may include too much data, including unwanted noise. Additionally, oftentimes, the phonetic summary may be created in a proprietary format, specific to a particular phonetic engine.

Included in this disclosure is a description of a phonetic transcript. A phonetic transcript is a simple text file containing a list of the individual speech sounds (phonemes) that occurred in a particular communication. One way to represent this data includes utilization of the International Phonetic Alphabet (IPA), which can be encoded for computer use using the ISO10646 standard (Unicode). As a nonlimiting example, a British pronunciation of: "the quick brown fox jumps over the lazy dog" may be represented as:

ð@ kwɪk braʊn fɒks dʤʊmps ɒvɜɪ ð@ leɪziɪ dɜg

An extended form of the phonetic transcript could add a time stamp in the recording to indicate a time that one or more phonemes occur. Some embodiments may also include the ability to specify multiple possible phonemes for each actual phoneme with confidence levels indicating how close a match there is between the phoneme in the recording and the phoneme as it would normally be expected to appear. One embodiment, among others includes producing an XML file using a simple schema for this data. These and other embodiments are described below with reference to the drawings.

FIG. 1 is a nonlimiting example of an embodiment of a system in which a user may be provided with customer service. As illustrated in this nonlimiting example, a caller can initiate a communication from a communications device 104. The communications request can be sent to call center 106 via network 100. Network 100 may include a Public Switched Telephone Network (PSTN), an Internet Protocol (IP) network, a cellular network, an Integrated Services Digital Network (ISDN), a Time Division Multiplexing (TDM) network, and/or other networks. Upon connecting with call center 106, a user at communications device 104 may facilitate a communication with a customer service representative. Additionally, during the communication, documentation of the communication can be recorded such that a business associated with call center 106 can determine the quality of customer service provided to the user of communications device 104.

As discussed above, in some configurations, a recording can be provided to a customer service representative (agent) to determine the quality of customer service. Similarly, some embodiments may include a text to voice conversion of the communication. LVCSR speech recognition may be configured to create an English (and/or other spoken language) translated textual document associated with the communication. While an LVCSR speech recognized textual document may provide enhanced searching capabilities related to the communication, LVCSR technologies may be slow and difficult to produce. Similarly, many phonetic technologies for speech recognition may be difficult to utilize one or more search functions associated with the communication.

Additionally, while a user can send a communication request via communication device 104, some embodiments may provide that a user utilizing computing device 108 may initiate a communication to call center 106 via network 100. In such configurations, a user may be utilizing a soft phone and/or other communications logic provided for initiating and facilitating a communication.

Figure 2:
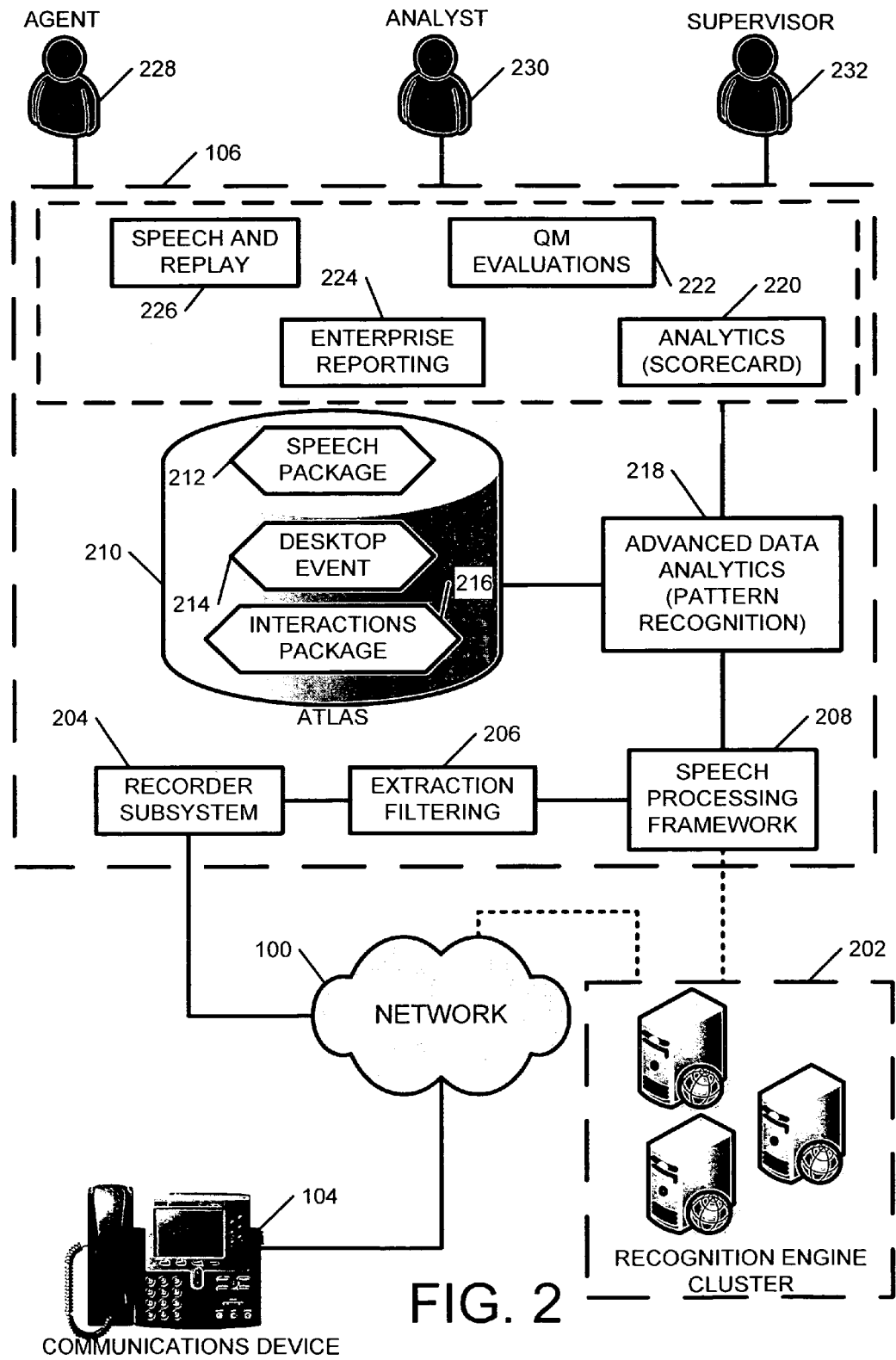
FIG. 2 is a nonlimiting example of a recording network configuration, in which recording and analytics may be provided, similar to the network configuration from FIG. 1.

FIG. 2 is a nonlimiting example of a recording network configuration, in which recording and analytics may be provided, similar to the network configuration from FIG. 1. As illustrated in the nonlimiting example of FIG. 2, communications device 104 can facilitate communications with call center 106 via network 100. Call center 106 can include one or more elements such as a recorder subsystem component 204, an extraction filtering component 206, and a speech processing firmware component 208. Also included in call center 106 is an advanced data analytics (pattern recognition) component 218 and an atlas component 210. Included in the atlas component 210 is a speech package 212, a desktop event 214, and an interactions package 216.

Call center 106 may also include an analytic scorecard 220, a quality management (QM) evaluations component 222, and enterprise reporting component 224, and a speech and replay component 226. An agent 228 (such as a customer service representative) can utilize one or more of the components of call center 106 to facilitate a communication with a caller on communications device 104. Similarly, an analyst 230 can utilize one or more components of call center 106 to analyze the quality of the communications between the agent 228 and the caller associated with communications device 104. A supervisor 232 may also have access to components of call center 106 to oversee the agent 228 and/or the analyst 230 and their interactions with a caller on communications device 104.

Additionally, a recognition engine cluster 202 may be coupled to call center 106 either directly and/or via network 100. Recognition engine cluster 202 may include one or more servers that may provide speech recognition functionality to call center 106.

In operation, a communication between a caller on communications device 104 and an agent 228 via network 100 may first be received by a recorder subsystem component 204. Recorder subsystem component 204 may record the communications in an audio format. The recorded audio may then be sent to an extraction filtering component 206, which may be configured to extract the dialogue (e.g., remove noise and other unwanted sounds) from the recording. The recorded communication can then be sent to a speech processing framework component 208 for converting the recorded audio communication into a textual format. Conversion of the audio into a textual format may be facilitated by a recognition engine cluster 202, however this is not a requirement. Regardless, conversion from the audio format to a textual format may be facilitated via LVCSR speech recognition technologies and/or phonetic speech recognition technologies, as discussed in more detail below.

Upon conversion from audio to a textual format, data related to the communication may be provided to advanced data analytics (pattern recognition) component 218. Advanced data analytics component 218 may be converted to provide analysis associated with the speech to text converted communication to determine the quality of customer service provided to the caller of communications device 104. Advanced data analytics component 218 may utilize atlas component 210 for facilitation of this analysis. More specifically, atlas component 210 may include a speech package component 212 that may be configured to analyze various patterns in the speech of the caller of communications device 104. Similarly, desktop event component 214 may be configured to analyze one or more actions that the user of communications device takes on their communications device 104. More specifically, a network 100 may facilitate communications in an IP network. As such, communications device 104 may facilitate both audio and/or data communications that may include audio, video, image, and/or other data. Additionally, advanced data analytics component 218 may utilize an interactions package 216 to determine various components of the interaction between agent 228 and the caller of communications device 104. Advanced data analytics component 218 may then make a determination based on predetermined criteria of the quality of call service provided by agent 228.

Advanced data analytics component 218 may then facilitate creation of an analytic scorecard 220 and provide enterprise reporting 224, as well as quality management evaluations 222 and speech and replay data 226. At least a portion of this data may be viewed by an agent 228, an analyst 230, and/or a supervisor 232. Additionally, as discussed in more detail below, an analyst 230 may further analyze the data to provide a basis for advanced data analytics component 218 to determine the quality of customer service.

Figure 3:
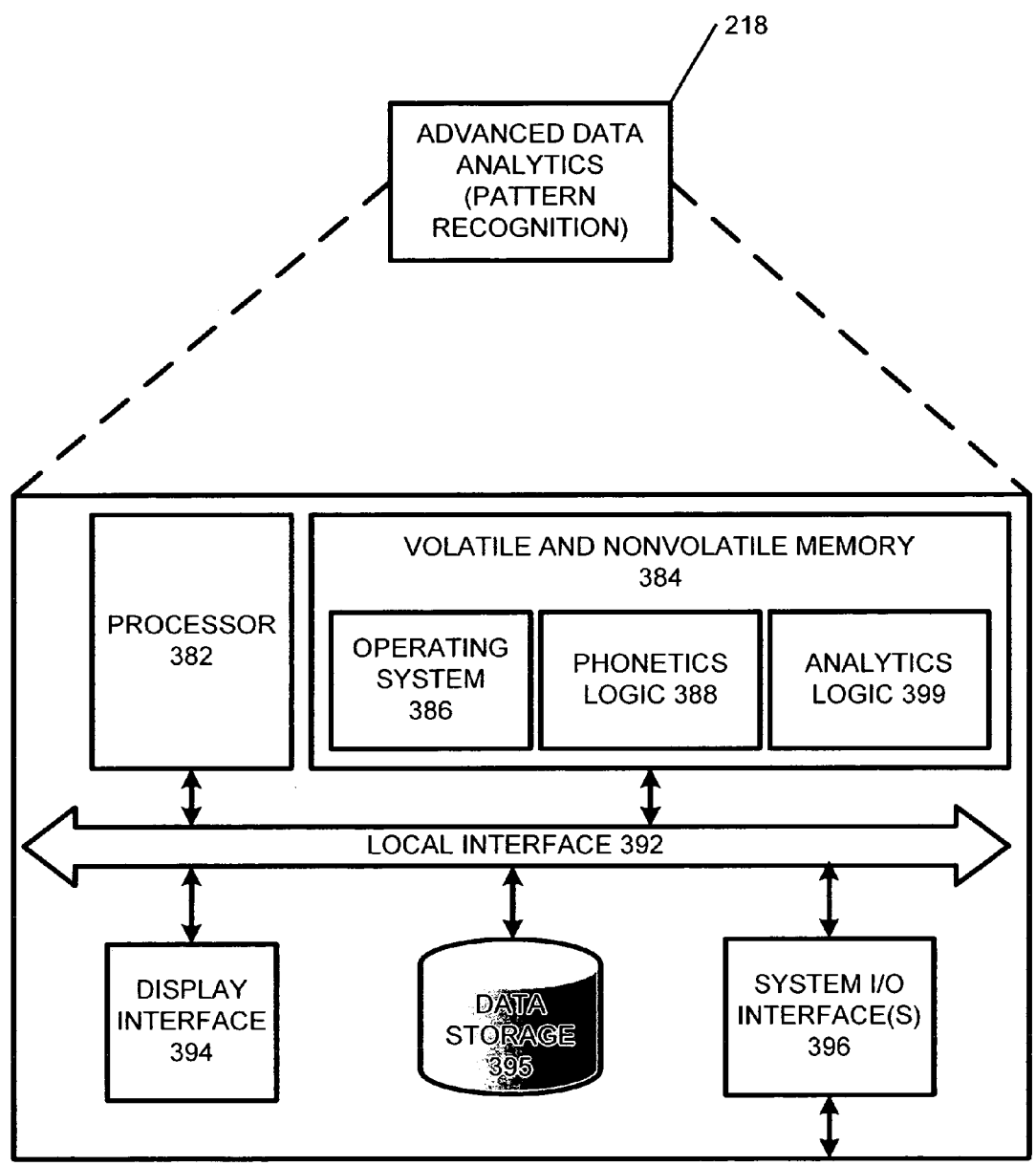
FIG. 3 is a functional block diagram illustrating an analytic component, similar to the analytic component from FIG. 2.

FIG. 3 is a functional block diagram illustrating an analytic component, similar to the analytic component from FIG. 2. Although a wire-line communications device is illustrated, this discussion can be applied to any device configured for receiving and/or sending data. As illustrated in FIG. 3, in terms of hardware architecture, advanced data analytics component 218 includes a processor 382, volatile and nonvolatile memory 384, a display interface 394, data storage 395, and one or more input and/or output (I/O) device interface(s) 396 that are communicatively coupled via a local interface 392. The local interface 392 can include, for example but not limited to, one or more buses and/or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a hardware device for executing software, particularly software stored in volatile and nonvolatile memory 384.

The processor 382 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing software instructions.

The volatile and nonvolatile memory 384 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory 384 may incorporate electronic, magnetic, optical, and/or other types of storage media. Note that the volatile and nonvolatile memory 384 can also have a distributed architecture, where various components are situated remotely from one another, but can be accessed by the processor 382.

The software in volatile and nonvolatile memory 384 may include one or more separate programs, each of which includes an ordered listing of executable instructions for implementing logical functions. In the example of FIG. 3, the software in the volatile and nonvolatile memory 384 may include phonetics logic 388, analytics logic 399, as well as an operating system 386, and a recording cache. Additionally, while logic components 386, 388, and 399 are each illustrated in this nonlimiting example as a single piece of logic, as one of ordinary skill in the art will understand, these components can include one or more separate software, hardware, or firmware modules. Similarly, one or more of these logical components can be combined to provide the desired functionality. Additionally, the operating system 386 may be configured to control the execution of other computer programs and may be configured to provide scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the Operating System 386.

The Input/Output devices that may be coupled to system I/O Interface(s) 396 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface, which is coupled to local interface 392 can be configured to communication with a communications network, such as the network from FIGS. 2 and 3. While this communication may be facilitated via a communications device, such as communications device 106, this is not a requirement.

If the computing device 108 is a personal computer, workstation, or the like, the software in the volatile and nonvolatile memory 384 may further include a basic input output system (BIOS) (omitted for simplicity). The BIOS is a set of software routines that initialize and test hardware at startup, start the Operating System 386, and support the transfer of data among the hardware devices. The BIOS is stored in ROM so that the BIOS can be executed when the computing device 108 is activated.

When the computing device 108 is in operation, the processor 382 can be configured to execute software stored within the volatile and nonvolatile memory 384, to communicate data to and from the volatile and nonvolatile memory 384, and to generally control operations of the computing device 108 pursuant to the software. Software in memory, in whole or in part, is read by the processor 382, perhaps buffered within the processor 382, and then executed. Additionally, one should note that while the above description is directed to a computing device 108, other devices (such as application server, capture control server, and central recording system) can also include the components described in FIG. 3.

One should note that advanced data analytics component 218 can be configured with one or more of the components and/or logic described above with respect to analytics component 218. Additionally, analytics component 218, communications device 104, computing device 108, and/or other components of call center 106 can include voice recognition logic, voice-to-text logic, text-to-voice logic, etc. (or any permutation thereof), as well as other components and/or logic for facilitating the functionality described herein. Additionally, in some exemplary embodiments, one or more of these components can include the functionality described with respect to analytics component 218.

Figure 4:
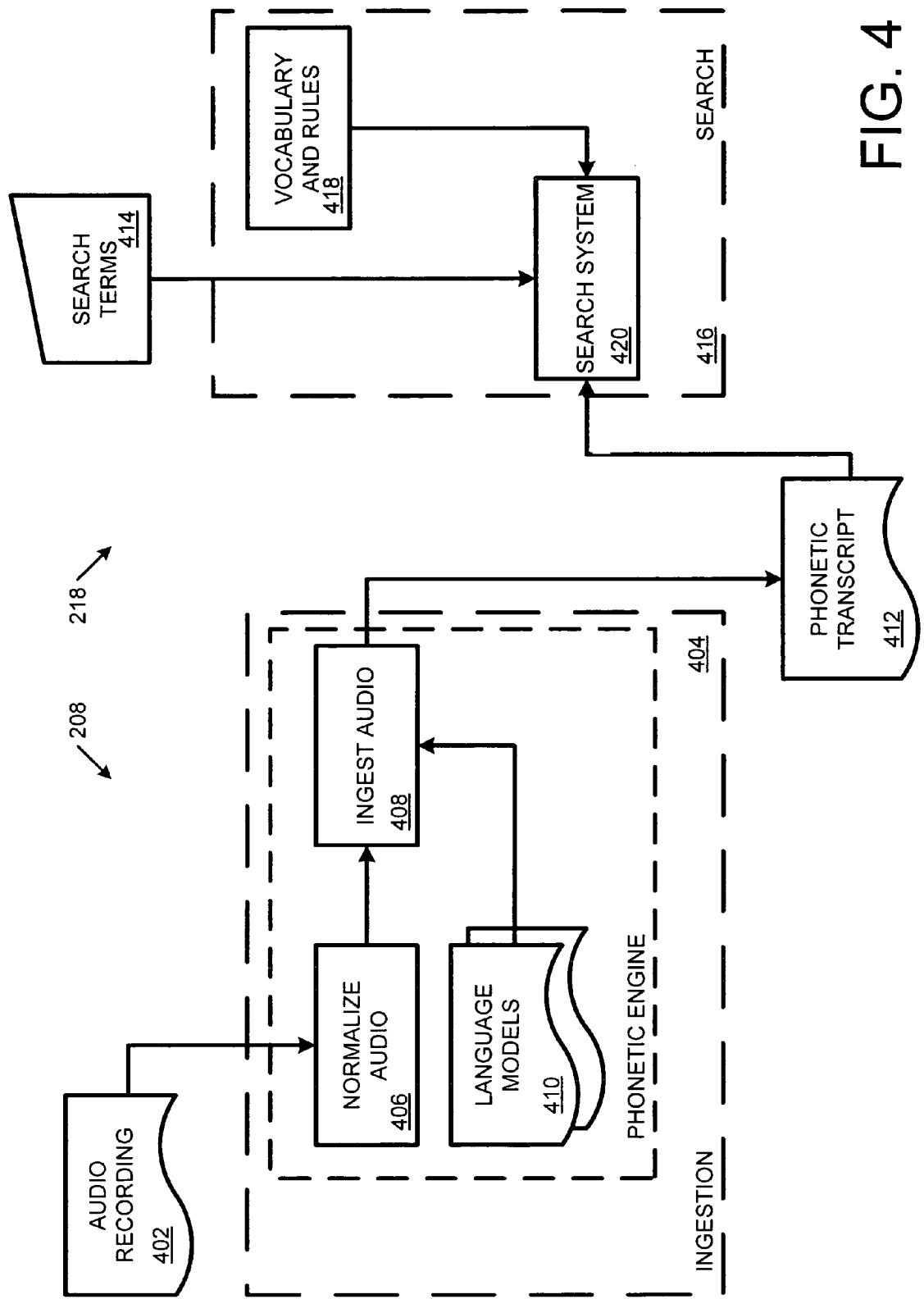
FIG. 4 is an exemplary embodiment of a functional flow diagram, illustrating components that may be utilized for a phonetics based analytic infrastructure, as may be utilized in the network of FIG. 1.

FIG. 4 is an exemplary functional flow diagram, illustrating components that may be utilized for a phonetics based analytic infrastructure, as may be utilized in the network of FIG. 1. As illustrated in the nonlimiting example of FIG. 4, speech recognition processing component 208 can receive an audio recording via extraction filtering component 206 and recorder subsystem component 204. Speech processing framework 208 may receive this data in an ingestion component 404 and more specifically in a normalized audio component 406. A normalized audio component 406 may be configured to facilitate the digitizing of the audio recording and/or other processing. Additionally, the normalized audio component 406 (which may be part of the phonetic engine) can send normalized audio to an ingest audio component 408. The ingest audio component 408 may be configured to receive the normalized audio and one or more language models 410 for ingesting the communications data into a phonetic transcript.

More specifically, ingest audio component 408 can be configured to facilitate the creation of a phonetic transcript with one or more phonemes that occur in the communication. One embodiment of a representation of the one or more phonemes can include the designation of International Phonetic Alphabet (IPA) which may be encoded for computer use using the ISO10646 standard (UNICODE). Ingest audio component 408 can then create the phonetic transcript 412.

Phonetic transcript 412 can then be sent to a search system 420 which is part of a search component 416. Search system 416 can also receive vocabulary and rules as designated by an analyst, such as analyst 230 from FIG. 2. Vocabulary and rules component 418 can designate one or more search trends and/or algorithms to be used in analyzing the phonetic transcript 412. Additionally, search terms 414 may be provided by analyst 230 to provide data associated with the quality of customer service provided to a caller.

As a nonlimiting example, referring to FIGS. 2 and 4, a user of communication device 104 may initiate communication with call center 106. The user of communication device 104 and an agent 228 may engage in a communication that includes the phrase "brown fox." In this communication, the agent 228 may be required to save the term "brown fox." As such, the communication can be recorded and the audio recording 402 can be sent to the base phonetic engine. The phonetic engine can apply language models 410 to ingest the audio recording at ingest audio component 408. The phonetic engine can thereby create a phonetic transcript 412.

The phonetic transcript can then be sent to a search component 416, which includes a search system 420. The search system 420 can utilize vocabulary and rules component 418, as well as receive the search terms 414. As indicated above, in this nonlimiting example, the search term "brown fox" can be a desired term to be found in a communication. The search system 420 can then search the phonetic transcript for phonemes related to the term "brown fox." As the phonetic transcript may not include an English translation of the audio recording, vocabulary and rules component 418 may be configured to provide a correlation between the search term 414 (which may be provided in English) and the phonetic representation of the desired search terms, which may include one or more phonemes.

If phonemes associated with the term "brown fox" appear in the phonetic transcript 412, a signal and/or scorecard can be provided to an analyst 230 for determining the quality of customer service provided by agent 228. Additionally, some embodiments can be configured to provide information to analyst 230 in the event that phonemes associated with the term "brown fox" does not appear in the communication. Similarly, other search terms and/or search criteria may be utilized to provide data to analyst 230.

Figure 5:
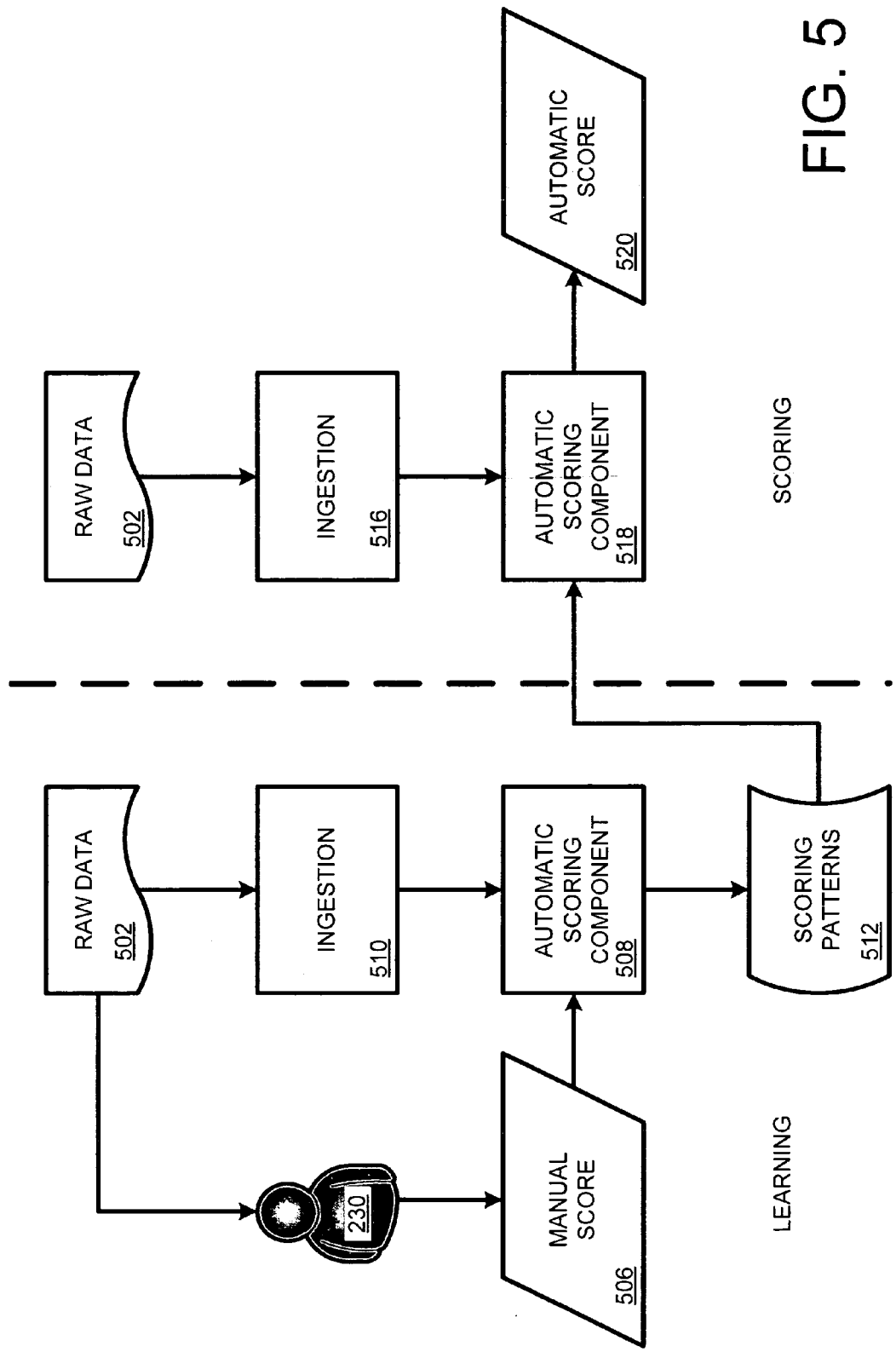
FIG. 5 is an exemplary embodiment of a functional flow diagram, illustrating a scoring infrastructure, similar to the diagram from FIG. 4.

FIG. 5 is an exemplary functional flow diagram, illustrating a scoring infrastructure, similar to the diagram from FIG. 4. As illustrated in the nonlimiting example of FIG. 5, raw data may be provided to agent 228, as well as ingestion component 510. Agent 230 can analyze the raw data and provide a manual score associated with the communication. More specifically, agent 228 can determine a score associated with the quality of customer service provided to a caller. Manual score 506 can then be sent to automatic scoring system 508.

Similarly, ingestion component 510 receives raw data 502 (which may include an audio recording of at least a portion of the communication) and convert the raw data into a phonetic transcript, as discussed above. The phonetic transcript can be provided to automatic scoring system 508. Automatic scoring system 508 can be configured to determine scoring patterns from the analyst 230 by applying the phonetic transcript to the manual score. More specifically, the automatic scoring component can determine a technique used by agent 228 in determining the manual score 506. The automatic scoring component can then create a scoring patterns document 512 that can be sent to automatic scoring component 518.

Similarly, on the scoring side of FIG. 5, raw data 502 may be provided to ingestion component 516. Ingestion component 516 may be configured to convert the received raw data into a phonetic transcript similar to ingestion component 510. One should note that ingestion component 516 may be included within ingestion component 510 and/or may be the same component altogether. However, in at least one embodiment, ingestion component 516 and ingestion component 510 are separate components.

Upon ingesting the raw data, ingestion component 516 can send the phonetic transcript to automatic scoring system 518 (which may or may not be different than automatic scoring system 508). Automatic scoring system 518 can be configured to receive the phonetic transcript as well as scoring patterns 512. Automatic scoring system can then determine a score for raw data 502 according to the scoring patterns 512. Automatic scoring system can then send the scoring patterns to create an automatic score 520 associated with the communication.

One should note that while raw data 502 on the scoring side of FIG. 5 may be the same as raw data 502 on the learning side of FIG. 5, this is a nonlimiting example. More specifically, in at least one embodiment, raw data on the scoring side of FIG. 5 may be associated with a different communication than raw data 502 on the learning side of FIG. 5. Similarly, while automatic scoring component 518 may be configured to determine an automatic score from scoring patterns and phonetic transcript from ingestion component 516, in at least one embodiment, automatic scoring component 518 may be configured to compare automatic score 520 with manual score 506 to determine errors in automatic scoring system 518.

Figure 6:
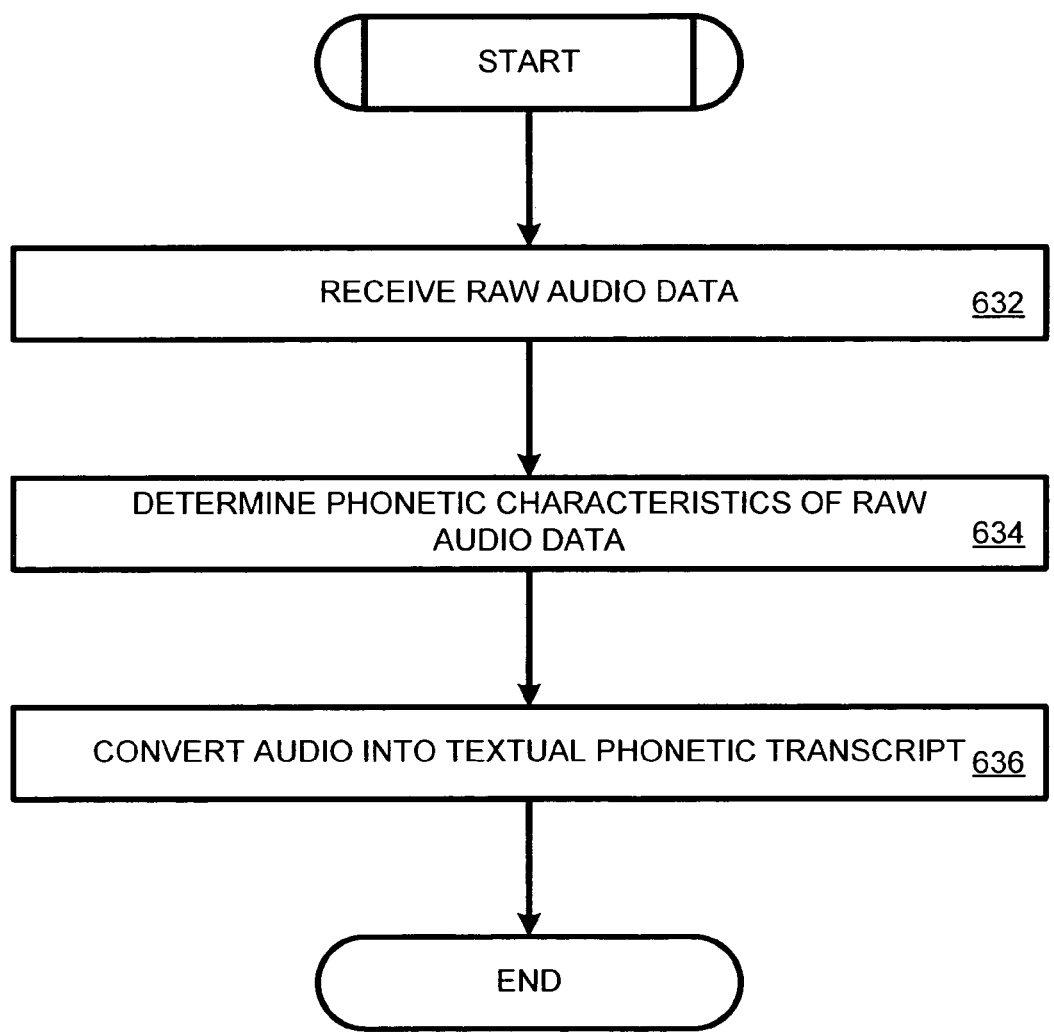
FIG. 6 is a flowchart illustrating an exemplary embodiment of a process that may be utilized for converting audio into a phonetic transcript, such as may be performed in the network configuration from FIG. 1.

FIG. 6 is a flowchart illustrating an exemplary process to be utilized for converting audio into a phonetic transcript, such as may be performed in the network configuration from FIG. 1. As illustrated in the nonlimiting example of FIG. 6, call center 106 may be configured to receive raw audio data (block 632). As discussed above, raw audio data may be received from a user and/or a customer service representative associated with call center 106. Upon receiving raw audio data, call center 106 can be configured to determine phonetic characteristics associated with the raw data (block 634). Call center 106 may then convert the audio into a textual phonetic transcript (block 636).

As discussed above, the textual phonetic transcript may be configured such that searching functionality may be performed. Similarly, depending on the particular embodiment, the textual phonetic transcript may be configured to determine unknown terms (e.g., phonemes) associated with the communication. More specifically, with the textual phonetic transcript, call center 106 may be configured to search the textual phonetic transcript to determine if a phoneme, a word, and/or a phrase are repeated in one or more communications. Call center 106 may be previously unaware of the phoneme, word, and/or phrase, however upon seeing the phoneme, word, and/or phrase in one or more communications, call center 106 may provide information associated with the phoneme, word, and/or phrase to agent 228.

Figure 7:
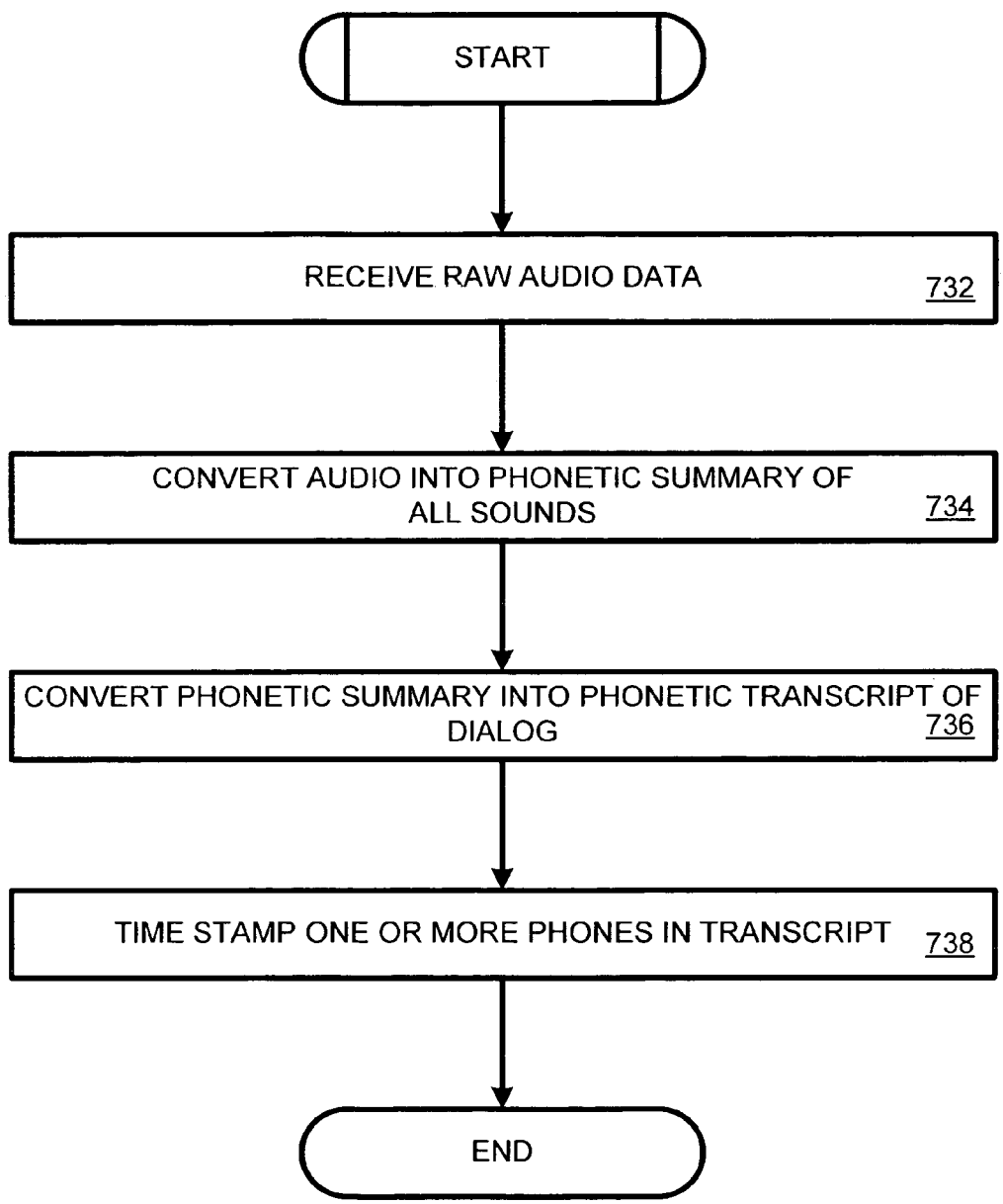
FIG. 7 is a flowchart illustrating an exemplary embodiment of a process that may be configured to convert a phonetic summary of all sounds into a phonetic transcript, similar to the flowchart from FIG. 6.

FIG. 7 is a flowchart illustrating an exemplary embodiment of a process that may be configured to convert a phonetic summary of all sounds into a phonetic transcript, similar to the flowchart from FIG. 6. As illustrated in the nonlimiting example of FIG. 7, call center 106 may be configured to receive raw data (block 732). Call center 106 may also be configured to convert the received audio (or at least a portion of the received audio) into a phonetic summary of all sounds (block 734). Call center 106 may then convert the phonetic summary into a phonetic transcript of the dialogue associated with the communication (block 736). More specifically, as the phonetic summary may include noise and other unwanted sounds that may have been recorded, call center 106 may be configured to filter out the unwanted noise and provide a transcript of dialogue. Additionally, in at least one nonlimiting example, the phonetic transcript may include a binary encoded document. Call center 106 may be configured to convert the binary phonetic transcript into a phonetic transcript in an IPA protocol, as described above. Call center 106 may then time stamp one or more of the phonemes in the transcript (block 738). The time stamp associated with one or more of the phonemes can provide further information associated with the communication.

Figure 8:
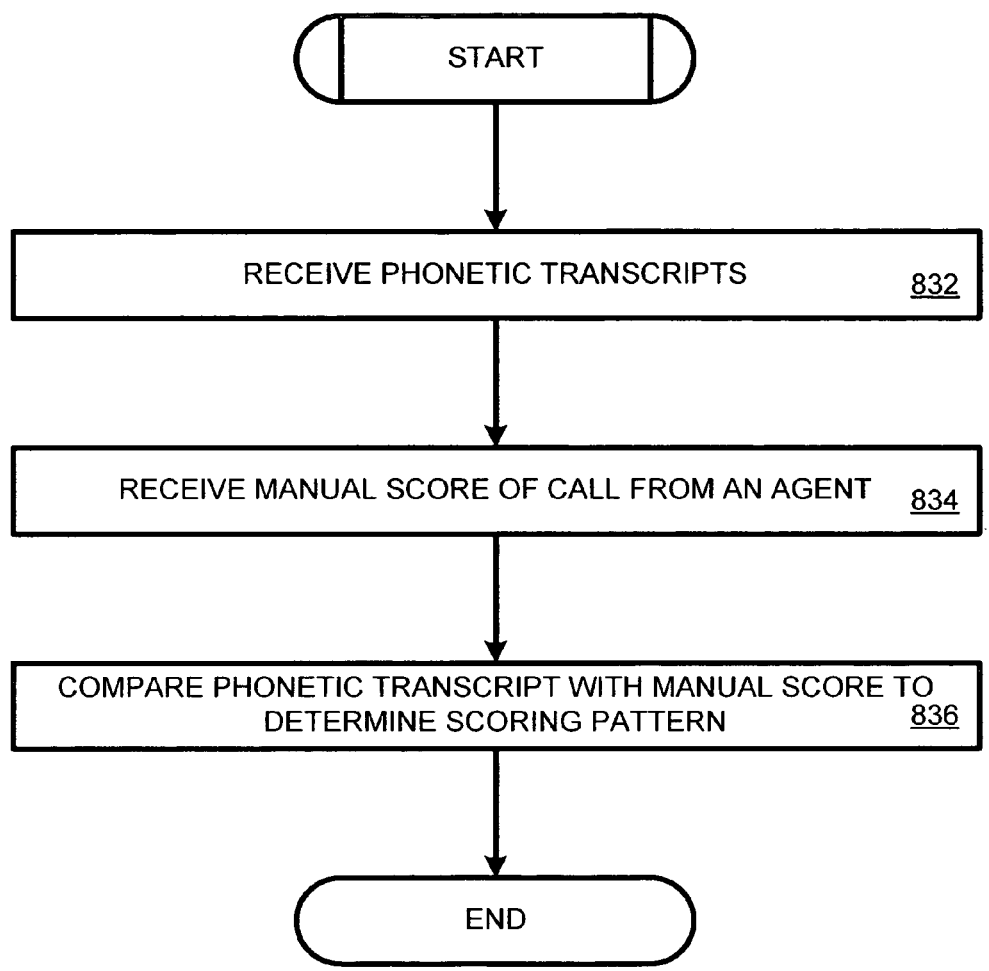
FIG. 8 is a flowchart illustrating an exemplary embodiment of a process that may be utilized for converting a phonetic transcript with a manual score to determine a scoring pattern, similar to the flowchart from FIG. 7.

FIG. 8 is a flowchart illustrating an exemplary embodiment of a process that may be utilized for converting a phonetic transcript with a manual score to determine a scoring pattern, similar to the flowchart from FIG. 7. As illustrated in the nonlimiting example of FIG. 8, call center 106 may be configured to receive one or more phonetic transcripts associated with each communication (block 832). Call center 106 may also be configured to receive a manual score of a call from an agent 228 (block 834). Call center 106 may then compare the phonetic transcript with a manual score to determine a scoring pattern (block 836). As discussed above, the phonetic transcript may provide call center 106 with the ability to perform statistical pattern recognition, where call center 106 can learn attributes and patterns of desirable and undesirable communications.

Figure 9:
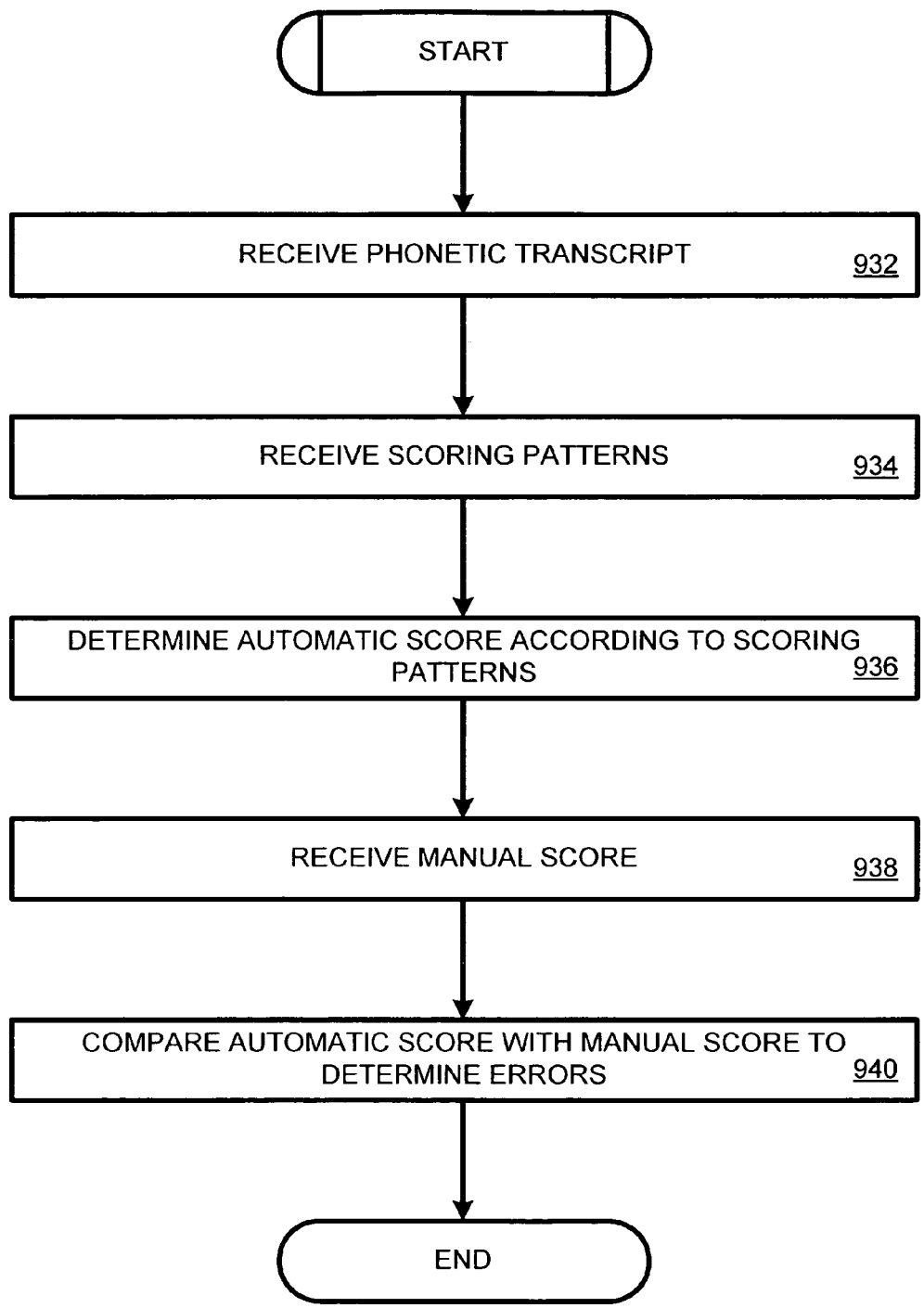
FIG. 9 is a flowchart illustrating an exemplary embodiment of a process that may be utilized for comparing automatic score with a manual score to determine errors in a communication transcript, similar to the flowchart from FIG. 8.

FIG. 9 is a flowchart illustrating an exemplary embodiment of a process that may be utilized for comparing automatic score with a manual score to determine errors in a communication transcript, similar to the flowchart from FIG. 8. As illustrated in the nonlimiting example of FIG. 9, call center 106 may be configured to receive a phonetic transcript (block 932). Call center 106 may then receive scoring patterns (block 934). As discussed above, scoring patterns may include manual scoring patterns received from agent 228. Call center 106 may then determine an automatic score according to the received scoring patterns (block 936).

Call center 106 may receive a manual score associated with the present communication (block 938). Call center 106 may then compare an automatic score with the received manual score to determine whether the automatic score includes one or more errors (block 940). As discussed above, this statistical pattern recognition allows call center 106 to learn not only patterns associated with scoring a communication, but also to determine accuracy data associated with scoring of the current communication.

One should also note that the above description could also include a hybrid system for recognizing and indexing speech. More specifically, in at least one exemplary embodiment, LVCSR may be utilized for word spotting and for short word detection. The phonetic transcript may be utilized for general searching. Other embodiments are also considered.

It should be noted that speech analytics (i.e., the analysis of recorded speech or real-time speech) can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This improves collection effectiveness and reduces corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. A method for providing speech analysis, comprising:
   receiving, at a contact center, audio data associated with a communication between an agent and a customer;
   determining, at a data analytics component executing on a processor of a computing device, at least one phoneme associated with the received audio data;
   providing, by the data analytics component, the at least one phoneme in a phonetic transcript, the phonetic transcript including at least one character from a phonetic alphabet; and
   determining, at the data analytics component, from the at least one phoneme, whether a the agent adheres to a predetermined script that the agent was to use in the communication between the agent and the customer, and if the agent needs additional training based on how well the agent adheres to the predetermined script.

2. The method of claim 1, wherein the phonetic alphabet includes the International Phonetic Alphabet.

3. The method of claim 2, wherein the phonetic alphabet is encoded for a computer using the ISO10646 standard.

4. The method of claim 1, further comprising:
   receiving search criteria for the phonetic transcript; and
   determining whether the search criteria is included in the phonetic transcript.

5. The method of claim 1, further comprising:
   receiving a manual score associated with the audio data; and
   determining at least one scoring pattern from the manual score.

6. The method of claim 1, further comprising:
   receiving a scoring pattern associated with the audio data; and
   determining, from the received scoring pattern, an automatic score associated with the audio data.

7. The method of claim 6, further comprising comparing the automatic score with a manual score to determine an accuracy component with the automatic score.

8. The method of claim 1, further comprising:
   monitoring a communication for audio data;
   forecasting an optimum level of service;
   scheduling a staffing level to achieve the forecasted optimum level of service;
   determining, from the scheduled staffing, at least one area for improvement; and
   readjusting scheduling according to the at least one area for improvement.

9. The method of claim 1, wherein determining whether the agent adheres to a predetermined script includes comparing the predetermined script with the phonetic transcript.

10. A system for providing speech analysis, comprising:
    an audio receiving component configured to receive audio data associated with a communication between an agent and a customer at a contact center;
    a phoneme determining component executing within a data analytics component executing on a processor of a computing device, configured to determine at least one phoneme associated with the received audio data;
    a providing component executing within the data analytics component configured to provide the at least one phoneme in a phonetic transcript, the phonetic transcript including at least one character from a phonetic alphabet; and
    a script determining component executing within a data analytics component configured to, from the at least one phoneme, determine whether the agent adheres to a predetermined script that the agent was to use in the communication between the agent and the customer, and if the agent needs additional training based on how well the agent adheres to the predetermined script.

11. The system of claim 10, wherein the phonetic alphabet includes the International Phonetic Alphabet.

12. The system of claim 10, wherein the phonetic alphabet is encoded for a computer using the ISO10646 standard.

13. The system of claim 10, further comprising:
    a criteria receiving component configured to receive search criteria for the phonetic transcript; and
    a criteria determining component configured to determine whether the search criteria is included in the phonetic transcript.

14. The system of claim 10, wherein the script determining component is configured to compare the predetermined script with the phonetic transcript to determine whether the agent adheres to a predetermined script.

15. The system of claim 10, further comprising:
    a manual score receiving component configured to receive a manual score associated with the audio data; and
    a manual score determining component configured to determine at least one scoring pattern from the manual score.

16. The system of claim 10, further comprising:
    a scoring pattern receiving component configured to receive a scoring pattern associated with the audio data; and
    an automatic score determining component configured to determine, from the received scoring pattern, an automatic score associated with the audio data.

17. The system of claim 16, further comprising a comparing component configured to compare the automatic score with a manual score to determine an accuracy component with the automatic score.

18. A non-transitory computer readable medium containing computer executable instructions that when executed by a processor of a computing device execute a method for providing speech analysis, comprising:
    audio receiving logic configured to receive audio data associated with a communication between an agent and a customer;

phoneme determining logic configured to determine at least one phoneme associated with the received audio data;

indexing logic configured to provide the at least one phoneme in a phonetic transcript index file, the phonetic transcript including at least one character from a phonetic alphabet;

criteria receiving logic configured to receive a predetermined script that the agent was to use in the communication between the agent and the customer; and criteria determining logic configured to determine whether the agent adheres to a predetermined script based on the phonetic transcript index file and if the agent needs additional training based on how well the agent adheres to the predetermined script.

19. The non-transitory computer readable medium of claim 18, wherein the phonetic alphabet includes the International Phonetic Alphabet.

20. The non-transitory computer readable medium of claim 18, further comprising:
manual score receiving logic configured to receive a manual score associated with the audio data; and
manual score determining logic configured to determine at least one scoring pattern from the manual score.

21. The non-transitory computer readable medium of claim 18, further comprising:
scoring pattern receiving logic configured to receive a scoring pattern associated with the audio data; and
automatic score determining logic configured to determine, from the received scoring pattern, an automatic score associated with the audio data.

22. The non-transitory computer readable medium of claim 21, further comprising comparing logic configured to compare the automatic score with a manual score to determine an accuracy component with the automatic score.

* * * * *